(12) United States Patent
Huang et al.

(10) Patent No.: US 7,921,033 B2
(45) Date of Patent: Apr. 5, 2011

(54) SYSTEM AND METHOD FOR HIGH-DENSITY INTERACTIVE VOTING USING A COMPUTER NETWORK

(75) Inventors: Jong S. Huang, Bellevue, WA (US); Ian Marriott, Issaquah, WA (US); Curtis N. von Veh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1922 days.

(21) Appl. No.: 09/772,382

(22) Filed: Jan. 29, 2001

(65) Prior Publication Data

US 2002/0103696 A1 Aug. 1, 2002

(51) Int. Cl.
*G06Q 10/00* (2006.01)
(52) U.S. Cl. .......................................................... 705/12
(58) Field of Classification Search .................... 705/11, 705/10, 12
See application file for complete search history.

(56) References Cited

U.S. PATENT DOCUMENTS

| | | | | |
|---|---|---|---|---|
| 5,218,528 | A | | 6/1993 | Wise et al. ..................... 364/409 |
| 5,287,507 | A | * | 2/1994 | Hamilton et al. ............. 719/315 |
| 5,465,384 | A | | 11/1995 | Bejan et al. ....................... 455/2 |
| 5,473,673 | A | * | 12/1995 | Van Wijk et al. .......... 379/92.01 |
| 5,495,532 | A | | 2/1996 | Kilian et al. ..................... 380/30 |
| 5,615,362 | A | * | 3/1997 | Jensen et al. .............. 707/103 R |
| 5,727,203 | A | * | 3/1998 | Hapner et al. ............. 707/103 R |
| 5,872,969 | A | * | 2/1999 | Copeland et al. ............. 718/101 |
| 5,884,316 | A | * | 3/1999 | Bernstein et al. ......... 707/103 R |
| 5,970,385 | A | * | 10/1999 | Pykalisto .................... 379/92.02 |
| 6,088,722 | A | * | 7/2000 | Herz et al. ..................... 709/217 |
| 6,092,051 | A | | 7/2000 | Kilian et al. ..................... 705/12 |
| 6,128,623 | A | * | 10/2000 | Mattis et al. .............. 707/103 R |
| 6,128,627 | A | * | 10/2000 | Mattis et al. ................... 707/202 |
| 6,175,833 | B1 | | 1/2001 | West et al. ..................... 707/102 |

(Continued)

OTHER PUBLICATIONS

PRNewswire, Apr. 1997, "Second Patent for Company Whose Technology Speeds Access to Relational Databases by as Much as 250 Times".*

(Continued)

*Primary Examiner* — Jonathan G Sterrett
(74) *Attorney, Agent, or Firm* — Lyon & Harr, L.L.P.; Craig S. Fischer (57) ABSTRACT

A system and method for facilitating high-density interactive voting (such as during a live event) using a computer network and tabulating and providing voting results in real-time. In general, the high-density interactive voting system of the present invention includes five major components that reside on the voting network: (1) a Live Event Wizard; (2) a Live Event Staging Component; (3) a Live Event Database; (4) a Live Event Object (LEO); and (5) a Live Event Display Engine. The Live Event Wizard is enables a user to quickly and easily create polling questions for distribution and presentation to a voter. The Live Event Staging Component ensures the validity of the polling questions and sends a copy of a live event definition and the polling questions to the Live Event Database. The Live Event Database tabulates current voting results at specified (or pre-determined) time intervals and performs statistical calculations of voting results. The present invention also includes a Live Event Object (LEO) that resides and remains in memory (such as random access memory (RAM)). The LEO establishes and maintains persistent connections with the Live Event Database such that these connections do not have to be continually opened and closed, thus greatly reducing the burden on the server and increasing system performance. The Live Event Display Engine receives the live event definition from the LEO and renders the definition and results on a display device for voters to view.

28 Claims, 5 Drawing Sheets

U.S. PATENT DOCUMENTS

| | | | | |
|---|---|---|---|---|
| 6,178,461 | B1* | 1/2001 | Chan et al. | 709/247 |
| 6,240,415 | B1* | 5/2001 | Blumberg | 707/9 |
| 6,256,675 | B1* | 7/2001 | Rabinovich | 709/241 |
| 6,304,879 | B1* | 10/2001 | Sobeski et al. | 707/103 R |
| 6,311,190 | B1* | 10/2001 | Bayer et al. | 707/104.1 |
| 6,317,778 | B1* | 11/2001 | Dias et al. | 709/214 |
| 6,439,997 | B1* | 8/2002 | Brasseur et al. | 463/40 |
| 6,567,818 | B1* | 5/2003 | Frey et al. | 707/103 R |
| 6,569,012 | B2* | 5/2003 | Lydon et al. | 463/9 |
| 2002/0046273 | A1* | 4/2002 | Lahr et al. | 709/224 |
| 2003/0120619 | A1* | 6/2003 | Osborn | 706/19 |
| 2004/0073631 | A1* | 4/2004 | Keorkunian et al. | 709/219 |

OTHER PUBLICATIONS

Ambler, Scott, Nov. 2000, Ronin International, "The Design of a Robust Persistence Layer for Relational Databases", http://www.ambysoft.com/persistenceLayer.pdf.*

Getting to know Oracle 8i, Release 8.1.5, "Programmatic Environments for Oracle Objects", copyright 1999 Oracle Corporation, pp. 1-18.*

Getting to know Oracle 8i, Release 8.1.5, "Programmatic Environments", copyright 1999 Oracle Corporation, pp. 1-27.*

Getting to know Oracle 8i, Release 8.1.5, "Release 8.0 New Features and Options", copyright 1999 Oracle Corporation, pp. 1-11.*

Davison, Brian, "A Survey of Proxy Cache Evaluation Techniques", Mar. 28, 1999, pp. 1-12.*

Neema, Farid, "Storage Caching Techniques", Oct. 1997, pp. 1-3.*

Web.archive.org, cacheflow.com, May 11, 1998, "Resource Library—What is Caching?", pp. 1-2.*

Web.archive.org, cacheflow.com, May 11, 1998, "Resource Library—High-Performance Web Caching White Paper", pp. 1-8.* www.databasejournal.com, "Introduction to Databases for Web", Nov. 23, 1998, part 4, pp. 1-9.*

Webster, John, "Does Oracle Really Do It All?", InternetWeek, Nov. 28, 2000, pp. 1-3.*

Oracle 8i™ Enterprise Edition, Technical Data Sheet, Nov. 1999, pp. 1-24.*

Fromhein, Dirk, Relational Object Framework for Java Beans, "UK Nextstep Mailing List", Jan. 12, 1998, pp. 1-3.*

Scholl, Mark; Schek, Hans-Joerg, "A Relational Object Model", 1990, Proceedings of the third international conference on database theory, pp. 1-3.*

Oracle 8™ Enterprise Edition Release 8.0, "New Features Overview", Jun. 1997, copyright Oracle Corporation, pp. 1-12.*

Rauch, Steven, "Manage Data from Myriad Sources with the Universal Data Access Interfaces", Sep. 1997, Microsoft.com/msj/0997/universaldata.aspx, pp. 1-19.*

Esposito, Dino, With Further ADO: Coding Active Data Objects 2.0 with Visual Studio 6.0, 1998, Microsoft.com/msj/0299/ado20/ado20.aspx, pp. 1-32.*

Web.archive.org, ircache.net, "2. Web Caching—Basics", Nov. 4, 1999, pp. 1-4.*

Web.archive.org, objectplanet.com, "Survey Web Survey Software", Nov. 27, 1999, pp. 1-2.*

City uses Spatial Direct on Oracle 8i, Mar. 3, 2000, safe.com/news/2000/63/, pp. 1-2.*

Dobson, Rick, "Data binding in Dynamic HTML", Mar. 98, DBMS, v11, n3, p. 47(5), Dialog 02176068 20527056.*

Allen, Doug, "Caches Serve up Response Time—To Reduce WAN Bandwidth and increase Web Response Time (well, Duh!), consider giving Content Delivery Providers and caching a try." Dec. 1, 2000, Network Magazine, p. 64, Dialog 08103606 67533183.*

Govatos, Greg, "The end of the worldwide wait (caching)", Feb 200, Communication News, v37, n2, p. 30, Dialog 07071817 59584642.*

Trupin, Joshua, "Putting your OLE controls to work with Microsoft Access, Visual Basic and C++", Feb. 1995, Microsoft Systems Journal, v10, n2, p. 45(11), Dialog 01725063 16018379.*

Gladney, Henry M, "A storage subsystem for image and records management", 1993, IBM Systems Journal, v32n3, pp. 512-540, Dialog 00759577 94-08969.*

The Dictionary of Computers, Information Processing and Telecommunications, 2nd Edition, © 1987, John Wiley & Sons, p. 516.*

Definition of "Real Time", http://www.microsoft.com/technet/prodtechnol/visio/visio2002/plan/glossary,mspx#ET1AE.*

Barish, Greg; Obraczka, Katia; "World Wide Web Caching: Trends and Techniques", © 2000 IEEE, May 2000, IEEE Communication Magazine, pp. 178-185.*

* cited by examiner

SYSTEM AND METHOD FOR HIGH-DENSITY INTERACTIVE VOTING USING A COMPUTER NETWORK

BACKGROUND OF THE INVENTION

1. Field of the Invention

The present invention relates in general to interactive voting using a computer network and more particularly to a system and method for facilitating high-density interactive voting (such as during a live event) using a computer network and providing voting results in real-time.

2. Related Art

Real-time polls using interactive voting over a computer network are popular for determining audience response to a particular survey question. Usually the real-time poll is conducted in connection with a live event such as a television or radio broadcast. The real-time poll and associated survey question typically coincides with a featured story being presented during the live event. Real-time polls using interactive voting are especially popular with live events such as television news magazine programs because such polls make television programs more interactive and give viewers an opportunity to voice their opinions in real time. In general, interactive voting involves presenting survey question and a number of responses to a voter (usually a member of the live event audience), determining a voter's response, and tabulating and presenting voting results. Real-time polls using interactive voting are becoming more pervasive due to the convergence of the television and the computer. Although the technology is available so that the voter can directly interact and vote using the television, the most common way for the voter to interactively respond to a survey question is by the voter using a computer connected to a computer network (such as the Internet).

By way of example, a sponsor of the live event (such as a television news magazine program) may conduct a real-time poll by posing a survey question to its audience, presenting a number of responses and asking the audience to vote on the survey question by visiting the sponsor's web site. The voter uses her computer to visit the sponsor's web site and selects a response to the survey question by clicking on one of the options. When the voter has finished voting she submits the response to the web site and the vote is transmitted from the user's computer to the web server at the sponsor's site. The web server receives the voter's vote, adds the vote to other votes received and tabulates the voting results. The voting results are posted as part of the story for the voter to observe how other people voted in comparison to her own vote. Because the television or radio broadcast is usually live (hence the phrase "live event") it is desirable for the sponsor to be able to conduct the entire real-time poll within the time constraints of the live event (typically one-hour in duration).

One interactive voting system and method is described in U.S. Pat. No. 6,175,833 (Ser. No. 09/064,567) by West et al. entitled "System and Method for Interactive Online Voting". This patent describes a database system for tracking votes cast by voters in response to an interactive poll and returning voting results. The voters cast votes by over a network (such as the Internet) and the voting results are returned to the voters. In general, a voter visits a web site containing the survey question and submits their vote to the web site. When the vote is submitted, the voting system opens a web page (such as an Active Server Page) that receives the vote and then transmits the vote to a database. The web page opens a connection to the database each time a voter submits a vote and then closes the connection. One problem with this type of interactive voting system, however, is that it was not designed to handle large volumes of votes within a short period of time (i.e., high-density voting). For example, this system typically can handle only about six votes per second, mainly because the database connections must be opened and closed each time a vote is submitted. This repeated opening and closing of database connections imposes a heavy burden on the web site server when there are a large number of voters in a short amount of time. In addition, the server is often overwhelmed which cause a malfunction or even shutdown of the computer system (also known as "crashing").

Accordingly, there exists a need for an interactive voting system and method using a computer network that is capable of handling high-density voting. What is also needed is a high-density interactive voting system and method that allows live television programs to be more interactive by allowing viewers of these television programs a chance to voice their opinions to a survey question and obtain the results in real time. What is further needed is a high-density interactive voting system and method that addresses the problem of repeated opening and closing of database connections whenever a large volume of votes is received in a short period of time.

SUMMARY OF THE INVENTION

To overcome the limitations in the prior art as described above and other limitations that will become apparent upon reading and understanding the present specification, the present invention includes system and method for facilitating high-density interactive voting over a network and providing voting results in real-time. The present invention facilitates real-time polling by providing a utility that aids and simplifies the creation of survey and demographic questions. Generally, these survey questions are provided during a live event (such as a television or radio broadcast) and responses and results are required within a short amount of time. This creates a high voting density on the network that can incapacitate an interactive voting network. The present invention uses novel features to maximize throughput over the voting network and allow high-density voting. In addition, the present invention is able to tabulate and return the voting results in real-time, thereby enabling the results of the voting to be broadcast during the live event.

In general, the high-density interactive voting system of the present invention includes five major components that reside on the voting network: (1) a Live Event Wizard; (2) a Live Event Staging Component; (3) a Live Event Database; (4) a Live Event Object (LEO); and (5) a Live Event Display Engine. The Live Event Wizard enables a user to quickly and easily create polling questions (such as survey and demographic questions) for distribution and presentation to a voter. The Live Event Staging Component ensures the validity of the survey and demographic questions and sends a copy of a live event definition to the Live Event Database. The Live Event Database (which may be, for example, based on Microsoft Structured Query Language (SQL)) contains all the database tables and stored procedures to maintain information and integrity related to the votes. Moreover, the Live Event Database is responsible for tabulating current voting results at specified (or predetermined) time intervals, and performing statistical calculations of voting results such as, by way of example, performing cross tabulation of questions versus demographics. The LEO is a server side object (and preferably may be used on Active Server Pages) that pools or combines connections to the Live Event Database, caches the votes received from voters and performs batch vote processing before sending the batch results to the Live Event Database. The Live Event Display Engine receives the live event definition from the LEO and renders the definition and results on a display device for voters to view.

The method of the present invention includes receiving votes from voters, tabulating the received votes at a specified time interval to generate intermediate voting results, caching the intermediate results in memory, and using the intermediate results to compute a final voting result. Receiving the votes from voters is accomplished using the LEO that resides in memory (such as random access memory (RAM)). In addition, the LEO maintains persistent connections with the Live Event Database. In other words, database connections are maintained and separate connections are not opened and closed each time a voter transmits a vote. Preferably, there are three persistent connections maintained: (1) the current voting results; (2) the raw vote cast by each voter; and (3) the live event definition.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention includes a high-density interactive voting system and method for facilitating high-density interactive voting (such as during a live event) using a computer network and providing voting results in real-time. In general, the present invention receives a vote over a computer network from a voter in response to a survey question, adds that vote to the other votes received and tabulates the votes to provide real-time voting results. In addition, the present invention is capable of handling high-density voting that is required in order to allows a large number of voters to vote in a short period of time and to obtain final voting results in real-time. Previous interactive voting system and techniques make direct database connections from a Web page (using, for example, an Active Server Page (ASP) page). Moreover, these techniques create a new and separate connection for each voter. Thus, each time a voter casts a vote a connection with the database is established and opened, the vote is written to the database and the connection is closed. During periods of high-density voting this continual opening and closing of database connections can severely strain and even shutdown the network.

The present invention alleviates this problem by providing a Live Event Object (LEO) that resides and remains in memory (such as random access memory (RAM)). The LEO is a self-contained entity that contains voting data and procedures and instructions for manipulating the voting data. Moreover, the LEO maintains persistent connections with a Live Event Database so that these connections do not have to continually be opened and closed. These persistent connections greatly reduce the burden on the server and increase system performance. In other words, maintaining these persistent connections significantly reduces the amount of processor time, bandwidth and memory needed to communicate with the Live Event Database. Moreover, the LEO caches in memory votes received from a large number of voters and, at a predefined interval, tallies and sends the intermediate voting results to the Live Event Database where the final results are generated from these intermediate voting results. Vote caching as performed by the present invention allows these intermediate voting results to be tabulated continuously to generate final voting results much faster than can be obtained by tabulating each vote individually. Thus, another advantage of the present invention is that, unlike previous interactive voting techniques that tabulate results after all the votes have been received, the present invention computes intermediate voting results at specified intervals to enable rapid and real-time tabulation of final voting results.

II. Exemplary Operating Environment

Figure 1:
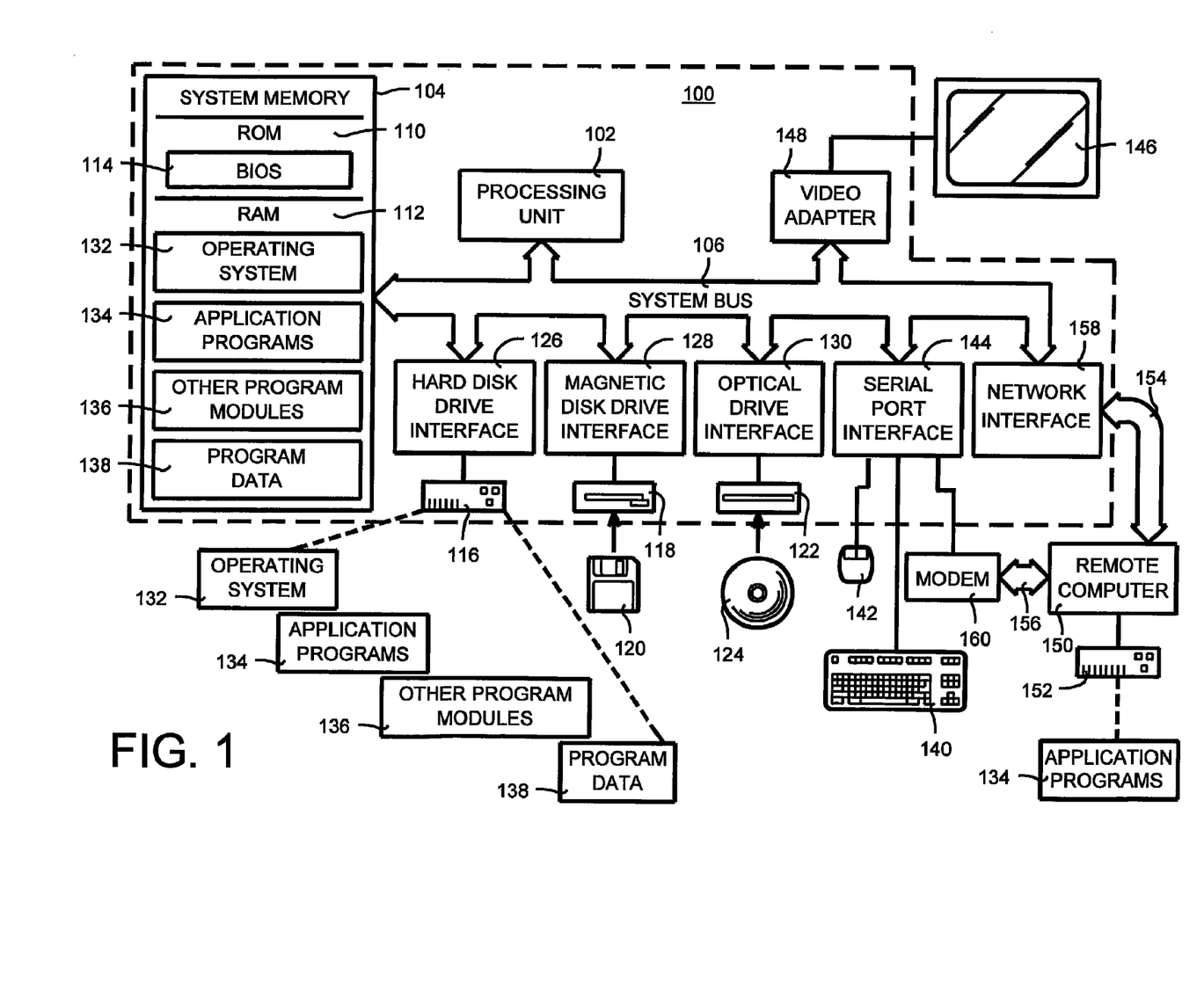
FIG. 1 is a block diagram illustrating a computing apparatus that preferably may be used to carry out the present invention.

FIG. 1 and the following discussion are intended to provide a brief, general description of a suitable computing environment in which the high-density interactive voting system and method of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the present invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk (not shown), a magnetic disk drive 118 for reading from or writing to a removable magnetic disk 120, and an optical disk drive 122 for reading from or writing to a removable optical disk 124 (such as a CD-ROM or other optical media). The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, other input devices (not shown) may be connected to the personal computer 100 including, for example, a microphone, joystick, game pad, satellite dish, scanner, and the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

III. General Overview

Figure 2:
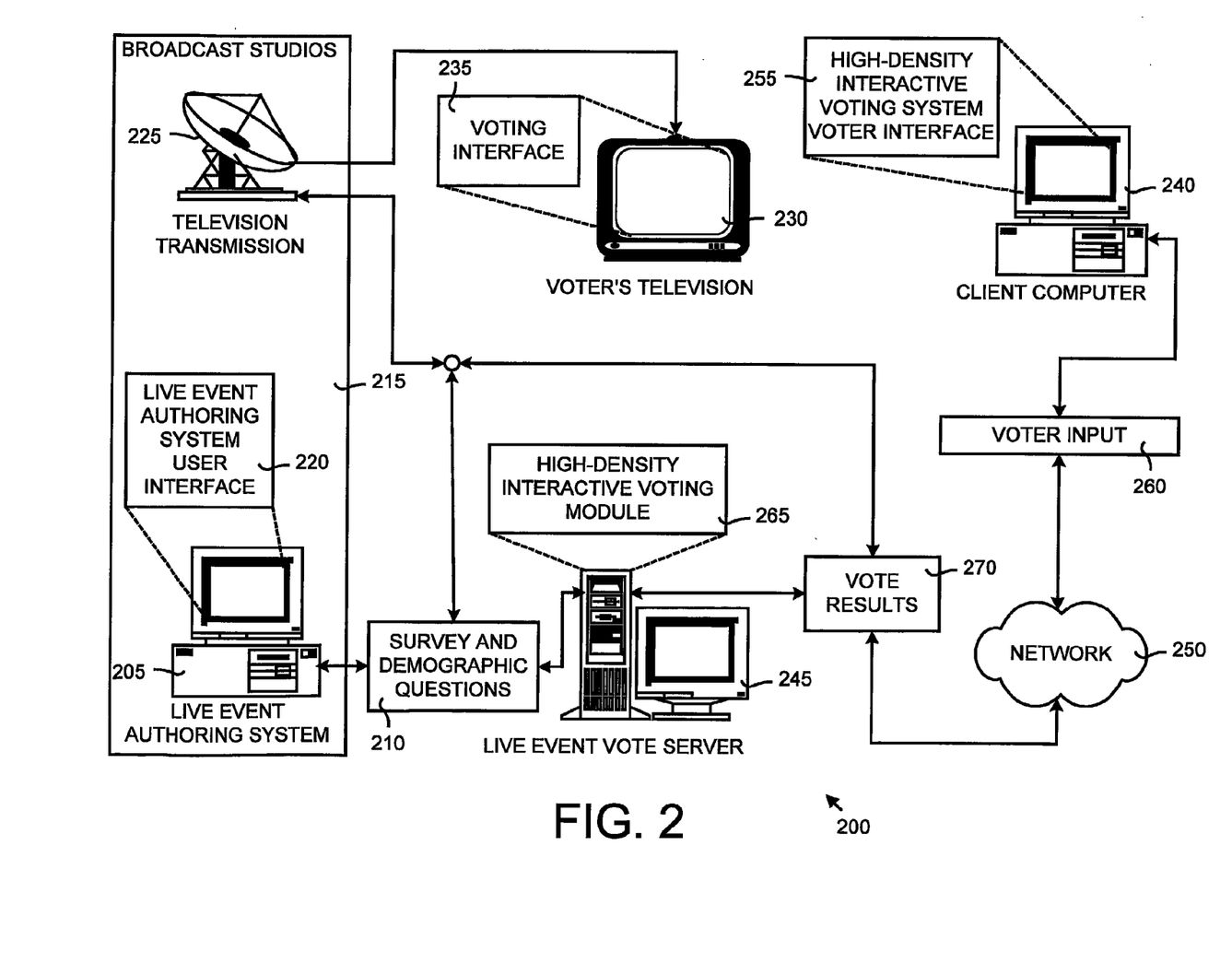
FIG. 2 is an overall block diagram of computer network using the computing apparatus of FIG. 1 and incorporating the high-density interactive voting system of the present invention.

The invention is embodied in a method and a system for facilitating high-density interactive voting over a network and obtaining voting results in real time. FIG. 2 is an overall block diagram of computer network using the computing apparatus of FIG. 1 and incorporating the high-density interactive voting system of the present invention. It should be noted that the high-density interactive voting system 200 illustrated is only one of several ways in which the present invention may be implemented.

In general, the high-density interactive voting system 200 includes a Live Event Authoring System 205 for facilitating the creation of survey and demographic questions 210 for a real-time poll. Typically, the Live Event Authoring System 205 will be located at the broadcast studios 215 of the sponsor of the real-time poll (such as a television network). A user (not shown) interacts with the Live Event Authoring System 205 through a Live Event Authoring System User Interface 220. In FIG. 2, the Live Event Authoring System 205 and the Live Event Authoring System User Interface 220 are shown as implemented on a computer (such as the computing apparatus of FIG. 1), although other implementations will be evident to those skilled in the art. Through the Live Event Authoring System User Interface 220, the user writes and edits survey questions related to the real-time poll and possible responses to the questions. In addition, the user can create demographic questions to determine how demographics influence results of the real-time poll. Many types of real-time polls may be conducted by generating a variety of questions and responses using the Live Event Authoring System 205.

The survey and demographic questions 210 are sent to television transmission facilities 225 for broadcast during a live event. In general, the real-poll is conducted during the live event and relates to the topic of discussion featured on the live event. For example, a television news magazine program may be featuring a story on the Electoral College, and one of the survey questions may be whether the Electoral College should be abolished. A viewer that is viewing the live event broadcast receives the broadcast by a television 230. At an appropriate time during the live event broadcast, the survey questions are displayed to a viewer through a voting interface 235 (such as a television screen) and the viewer is asked to participate in the real-time poll by logging on to a web site (usually the web site of the live event sponsor). For example, during a live television new magazine program the on-air personality will instruct viewers to log onto a web site and participate in the online real-time poll on a topic that is being presented by the program. The present invention tabulates and displays the results of this real-time poll instantly.

If a viewer decides to participate in the real-time poll, the viewer uses a client computer 240 to access the designated web site. The client computer 240 and a Live Event Vote Server 245 communicate over a network 250 and form a computer network. The survey and demographic questions 210 are been sent to the Live Event Vote Server 245 and are displayed on the web site for the voter to view. On the client computer 240, the voter is able to view the survey and demographic questions 210 and cast votes using a High-Density Interactive Voting System Voter Interface 255 of the present invention. Once the voter cast a vote, a voter input 260 is transmitted over the network 250 to the Live Event Vote Server 245. As discussed in detail below, a High-Density Interactive Voting Module 265 resides on the Live Event Vote Server 245 and efficiently receives and tabulates the results of the voting in real-time. These vote results 270 are sent to the client computer 240 over the network 250 for display to the voter through the High-Density Interactive Voting System Voter Interface 255. In addition, the vote results 270 are sent to the broadcast studios 215 for transmission 225 to the voter's television 230 and the vote results 270 are displayed by the voting interface 235. Preferably, the vote results 270 are tabulated and transmitted prior to the conclusion of the live event broadcast so that viewers can see the results of the real-time poll.

IV. Components and Operation of the Invention

Figure 3:
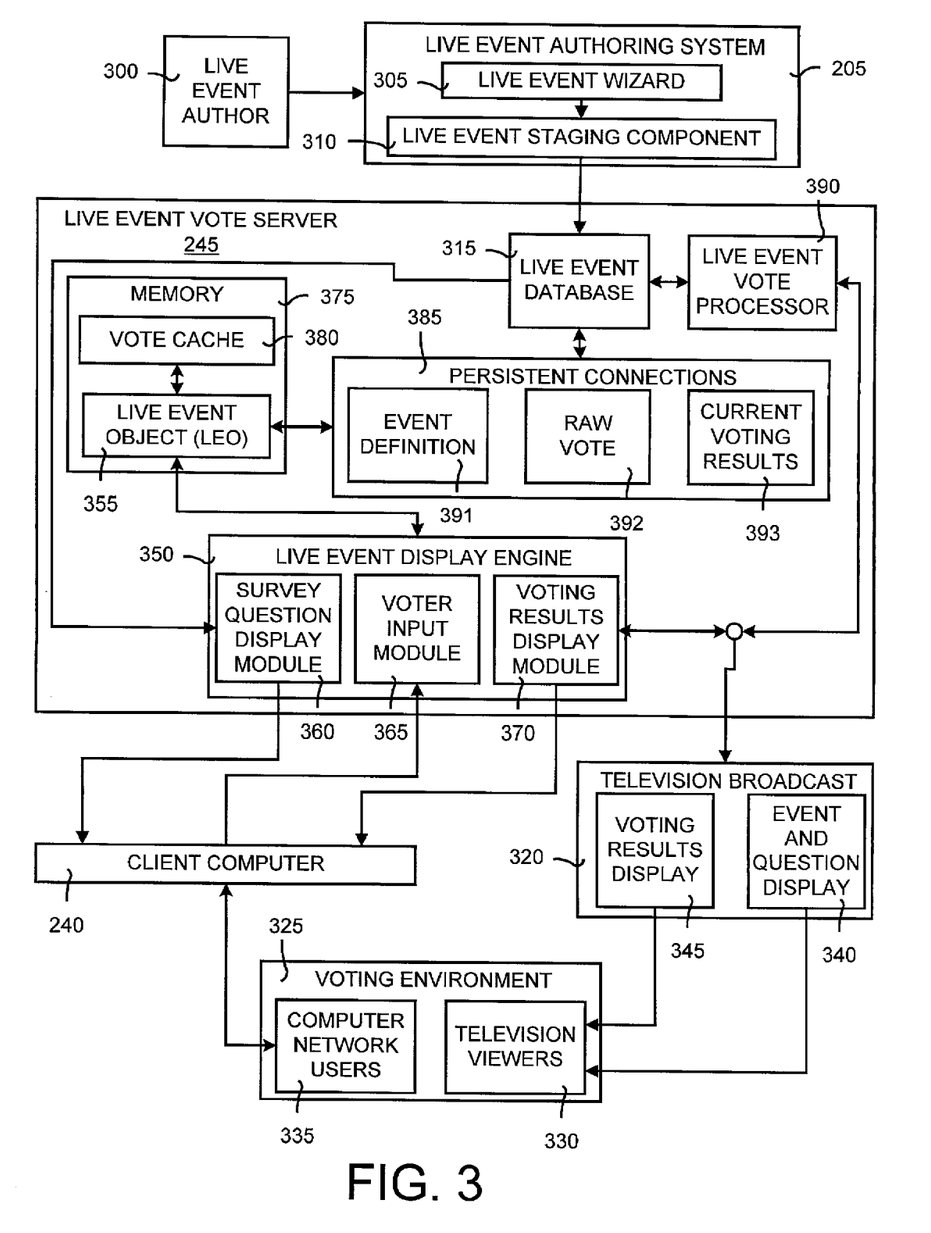
FIG. 3 is a general block diagram illustrating the components of the high-density interactive voting system of FIG. 2.

FIG. 3 is a general block diagram illustrating the components of the high-density interactive voting system of FIG. 2. In general, the voting system includes a Live Event Authoring System 205, a Live Event Vote Server 245 and a client computer 240. The Live Event Authoring System 205 enables a live event author 300 to define an event and create polling questions associated with the event. The Live Event Authoring System 205 includes a Live Event Wizard 305 and a Live Event Staging Component 310. The Live Event Wizard 305 is a tool for the Live Event Author 300 to use that enables the rapid creation of survey and demographic questions associated with a real-time poll. The Live Event Staging Component 310 checks the validity of the survey and demographic questions to ensure that no errors or incongruities are present and also copies the event definition to a Live Event Database 315.

The Live Event Vote Server 245 is part of a computer network and is in communication with a plurality of computers, as represented by the client computer 240. In addition, it should be noted that the Live Event Vote Server 245 may include a plurality of servers such that the entire high-density interactive voting system of the present invention is scalable by using either one or more servers. By way of example, the voting density of a single server is approximately 70 votes/second while the voting density across a plurality of servers will increase in direct proportion to the number servers deployed. Therefore, if a high voting density is anticipated additional servers may be added to the Live Event Vote Server 245 to enable high-density voting.

The Live Event Vote Server 245 is in communication with the Live Event Authoring System 205, the client computer 240 and a television broadcast 320. A voting environment 325, which is the environment where a voter interacts with the high-density interactive voting system of the present invention, includes television viewers 330 and computer network users (or voters) 335. The television broadcast 320 includes an event and question display 340 for displaying the survey questions to the television viewers 330 and a voting results display 345 for displaying voting results to the viewers 330. The voter (who is also a television viewer 330) views the survey questions on a television (not shown), decides to vote and then accesses the Live Event Vote Server 245 through the appropriate web site. Other voters also access the Server 245 and each of these computer network users 335 access the web site and connect to the Server 245 using their individual client computer 240.

The Live Event Vote Server 245 includes a Live Event Database 315, a Live Event Display Engine and a Live Event Object 355. The Live Event Database 315, which is preferably based on Microsoft Structured Query Language (SQL), contains all the database tables and stored procedures to maintain voting-related information and integrity. In addition, the Live Event Database 315 receives and stores polling questions and event definitions created by the Live Event Authoring System 205 and stores voting results. The Live Event Display Engine 350 includes a survey question display module 360 for obtaining event definition and polling questions from the Live Event Object 355 and the Live Event Database 315 and rendering them on the client computer 240. Moreover, the Live Event Display Engine 350 includes a Voter Input Module 365 for receiving raw votes from each voter, and a Voting Results Display Module 370 for obtaining voting results from the Live Event Database 315 and rendering them on the client computer 240. In addition, the voting results are sent to the television broadcast 320 so that the television viewers 330 can view the voting results.

At the heart of the Live Event Vote Server 245 is the Live Event Object (LEO) 355.

The LEO 355 is a server-side object that pools database connections, caches votes received and performs batch processing prior to sending the batch results to the Live Event Database 315. The LEO 355 resides in memory 375 and includes a voting cache 380 used for caching votes. When an event is defined and the first votes are received concerning the event, the LEO 355 makes persistent connections 385 with the Live Event Database 315. These connections are persistent because once they are established they remain open and do not close once an individual vote has been sent to the Live Event Database 315. The LEO 355 receives a vote from the Voter Input Module 365 and caches the vote along with other received votes in the Voting Cache 380. At a predefined interval the votes within the Voting Cache 380 sent to the Live Event Database 315 and are tabulated using a Live Event Vote Processor 390 to generate intermediate voting results. Preferably, a plurality of intermediate voting results are generated and stored in the Live Event Database 315. In order to determine final voting results, the Live Event Vote Processor 390 is used to tally the intermediate voting results to arrive at a final voting result.

In a preferred embodiment, the LEO 355 maintains three persistent connections with the Live Event Database 315 including an Event Definition 391, a Raw Vote 392 and Current Voting Results 393. When an event definition is sent to the Live Event Vote Server 245 and posted on the web site, the Event Definition 391 persistent connection is used by LEO 355 to load the event. LEO 355 is responsible for delivering survey content (questions and allowed responses) and tabulations (current voting results and percentages) as needed to, for example, an Active Server Page (ASP). The LEO 355 accomplishes this by establishing and maintaining a Raw Vote 392 persistent connection with the Live Event Database 315 for sending accumulated vote tabulations from the Voting Cache 320 to the Live Event Database 315. Moreover, the LEO 355 establishes and maintains a Current Voting Results 393 persistent connection to the Live Event Database 315 to query the Live Event Database 315 for the updated voting results and deliver these results to the Live Event Display Engine 350 and the television broadcast 320. If the persistent connections 385 are broken for some reason then LEO 355 will attempt to re-establish the connections. The persistent connections 385 are closed only when the LEO 355 is shut down.

The LEO 355 manages a list of current event definitions on which a voter can vote. These event definitions are constructed by running a set of instructions (or Stored Procedure) the first time that they are requested by a client. Subsequently, the event definitions are cached in memory until they expire. By default, all event definitions are removed from the event list after a predetermined time (such as 24 hours). The event definition list manages itself without any human intervention. If an event is requested again after it has been removed from the event list, the event is reconstructed from the Live Event Database 315.

Votes received by the LEO 355 are cached into the Voting Cache 380 for a predefined time interval and then processed as a batch. In a preferred embodiment, the LEO 355 processes the cached votes every 15 seconds. Alternatively, a different time interval may be selected by a user. The LEO 355 obtains the votes in the batch and tabulates the votes accumulated within the batch for the predefined time interval. These intermediate voting results are then written to the Live Event Database 315. In order to support cross-tabulation of demographic data, raw votes are also written to the Live Event Database 315. The intermediate voting results are cached into memory for all the current events. Periodically, the LEO 355 will refresh the results cached in memory by obtaining the update results from the Live Event Database 355. In a preferred embodiment, the LEO 355 refreshes the voting results approximately every 10 seconds.

Figure 4:
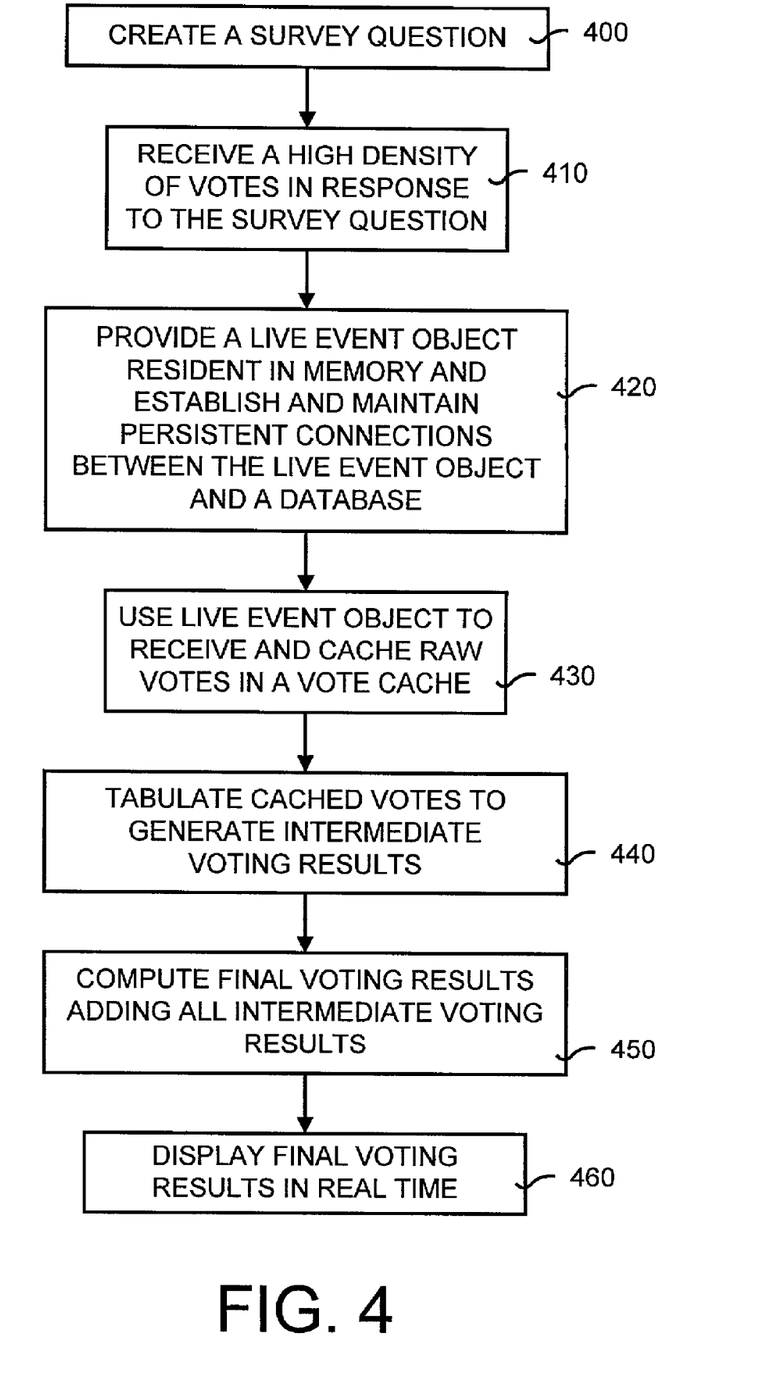
FIG. 4 is a general flow diagram of the operation of the high-density interactive voting system shown in FIGS. 2 and 3.

FIG. 4 is a general flow diagram of the operation of the high-density interactive voting system shown in FIGS. 2 and 3. In general, the method of the present invention includes facilitating high-density voting over a computer network and tabulating and presenting the final voting results in real-time. More specifically, referring to FIG. 4, the method of the present invention includes creating a survey question (box 400) and receiving a high density of votes in response to the survey question (box 410). Next, the Live Event Object 355 is provided such that the Object 355 is resident in memory and persistent connections are established and maintained between the Live Event Object 355 and a database (box 420). The database may include, for example, the Live Event Database 315.

The Live Event Object 355 is used to receive and cache the received votes in the Vote Cache 380 (box 430). At a predefined interval, the cached votes are tabulated to generate intermediate voting results (box 440). Final voting results computed by adding all the intermediate voting results (box 450) and these final voting results are display in real time (box 460).

Figure 5:
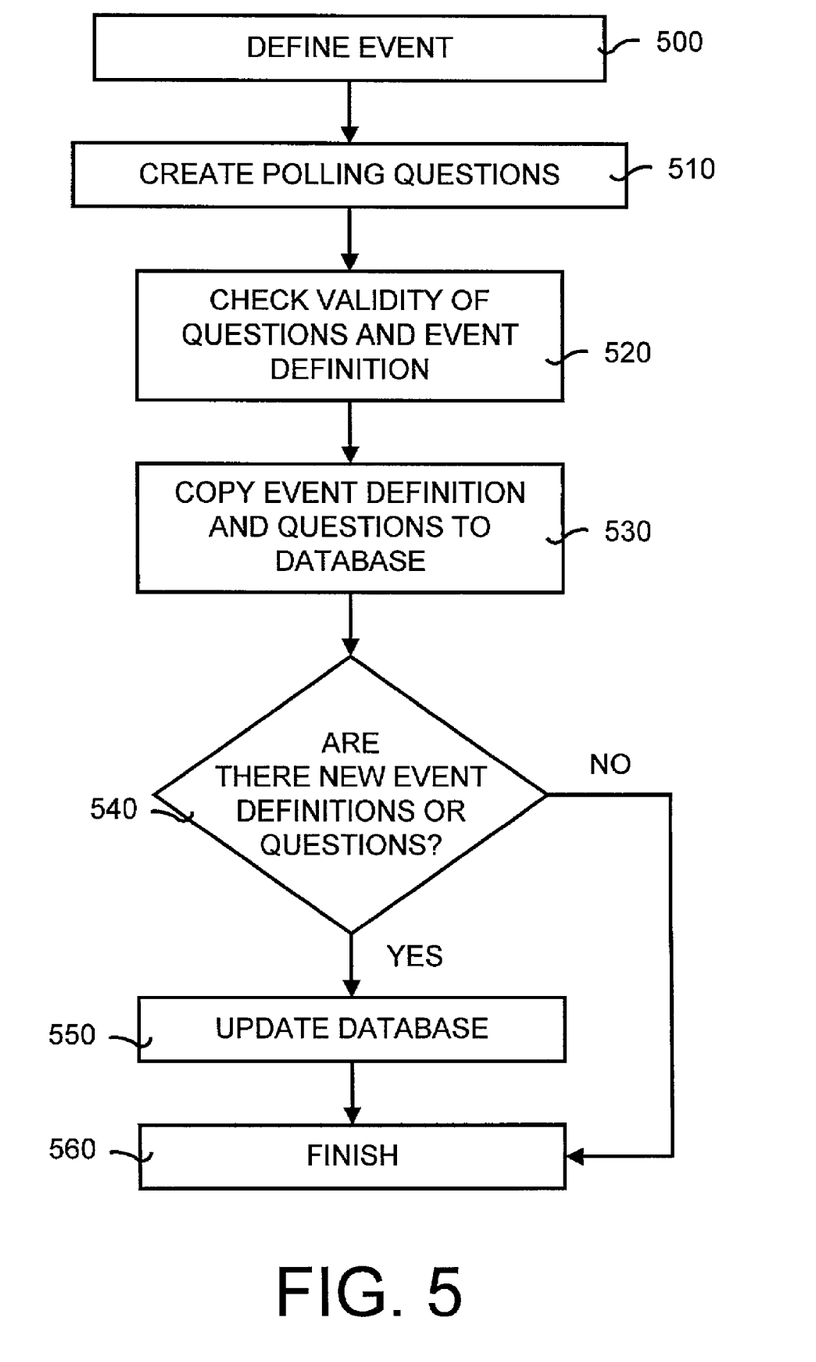
FIG. 5 is a detailed flow diagram illustrating the operation of the Live Event Wizard and the Live Event Staging Component of the Live Event Authoring System shown in FIG. 3.

FIG. 5 is a detailed flow diagram illustrating the operation of the Live Event Wizard and the Live Event Staging Component of the Live Event Authoring System shown in FIG. 3. In particular, the Live Event Wizard is used to define an event (box 500) and create polling questions (box 510). The Live Event Staging Component checks the validity of the questions and the event definition (box 520). In addition, the event definition and questions are copied to the database (box 530). At a predetermined time (such as every minute) an inquiry is made as to whether there are new event definitions or questions (box 540). If so, then the database is updated (box 550). Otherwise, the process finishes (box 560) until the next check for new event definition or questions.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for facilitating interactive voting over the Internet during a corresponding live television broadcast event, comprising:
  presenting a survey question and a plurality of responses to voters viewing the live television broadcast event;
  directing the voters to cast votes over the Internet at a web site of a sponsor of the live television broadcast event;
  transmitting each of the votes over the Internet to a server of the web site;
  receiving raw votes from the voters over the Internet at the web site server in response to the survey question;
  providing a Live Event Object residing on the server that maintains persistent connections between the Live Event Object and a database;
  caching the raw votes received from the voters in a memory cache of the Live Event Object for a predefined time interval, the raw votes having never been written in a database;
  tabulating as a batch in the memory cache the cached raw votes accumulated over the predefined time interval to generate intermediate voting results, wherein the votes are cached and tabulated in the Live Event Object prior to writing in the database;
  writing the intermediate voting results and each raw vote accumulated over the predefined time interval to the database at the predefined interval only after each raw vote received has been cached and tabulated as a batch in the memory cache;
  computing in real time a final voting result to the survey question by continuously tallying each of the intermediate voting results written in the database; and
  presenting the final voting results to viewers on the live television broadcast event prior to its conclusion.

2. A computer-readable medium having computer-executable instructions for performing the method recited in claim 1.

3. The method as set forth in claim 1, wherein the Live Event Object is resident in computer memory on the server.

4. The method as set forth in claim 1, wherein the Live Event Object establishes and maintains at least three persistent connections.

5. The method as set forth in claim 4, wherein the persistent connections include a raw vote cast by each of the voters.

6. The method as set forth in claim 4, wherein the persistent connections include current voting results obtained using the cached votes.

7. The method as set forth in claim 4, wherein the interactive voting is in response to the survey question asked during a live event and the persistent connections include a definition of the live event.

8. The method as set forth in claim 1, further comprising tabulating the intermediate voting results to compute final voting results.

9. The method as set forth in claim 1, further comprising creating the survey question.

10. The method as set forth in claim 9, further comprising defining an event in which the survey question is asked and checking a validity of the survey question and the event definition to ensure accuracy.

11. The method as set forth in claim 9, further comprising determining whether there has been a new survey question created and, if so, then updating the database.

12. An interactive voting system using a computer network, comprising:
a server in communication with the computer network for receiving votes from a plurality of voters in response to a polling question presented to the voters during a live broadcast event that directs the plurality of voters to respond to the polling question by visiting a web site;
an object residing in a memory cache on the server for caching raw votes received from the voters during a predefined time interval, the raw votes having never been written to a database, and summing as, a batch the raw votes accumulated during that predefined time interval to compute an intermediate voting result, wherein the object is a non-relational object;
a database having a connection with the object that receives and writes the intermediate voting result and each raw vote received during the predefined tine interval to the database at the predefined time interval only after each raw vote received has been cached and tabulated as a batch in the memory cache, such that a plurality of intermediate voting results for different time intervals are generated; and
a final voting result tabulated in real time by summing each of the plurality of intermediate voting results and presented during the live broadcast event,
wherein the votes are cached and summed in the object prior to writing in the database.

13. The interactive voting system as set forth in claim 12, wherein the object is a Live Event Object containing at least some of the voting data as well as procedures and instructions for manipulating at least some of the voting data.

14. The interactive voting system as set forth in claim 12, further comprising a persistent connection between the object and the database that is established and maintained by the object.

15. The interactive voting system as set forth in claim 14, wherein the persistent connection further comprises at least three persistent connections.

16. The interactive voting system as set forth in claim 12, further comprising an authoring system that enables a user to define an event and create polling questions associated with the event for distribution to the voters, wherein the authoring system is located at broadcast studios where the live broadcast event is occurring.

17. The interactive voting system as set forth in claim 16, wherein the authoring system further comprises a staging component that copies the event definition and polling questions to the database.

18. An interactive voting system that uses a computer network to process voting data in response to a survey question asked during a live television broadcast, comprising a Live Event Vote Server in communication with the computer network and accessible at a web site of a sponsor of the live television broadcast, a Live Event Object residing in a memory cache on a Live Event Vote Server, the Live Event Object receiving and caching voting data over a predefined time interval from a client in communication with the computer network, the voting data having never been written in a database, the voting data representing responses to the survey questions given by viewers of the live television broadcast after having visited the sponsor's web site, tabulating as a batch the cached voting data accumulated over the predefined time interval to generate an intermediate voting result, and writing the intermediate voting results and each raw vote accumulated over the predefined time interval to the database which is a Live Event Database through persistent connections between the Live Event Object and the Live Event Database only after each raw vote received has been cached and tabulated as a batch in the memory cache, such that the intermediate voting result is used to compute a final voting result in real-time and the final voting result is presented to television viewers during the live television broadcast, wherein the voting data is cached and tabulated in the Live Event Object prior to writing to the Live Event Database.

19. The interactive voting system as set forth in claim 18, further comprising a vote cache that receives and caches at least some of the voting data from the Live Event Object.

20. The interactive voting system as set forth in claim 19, further comprising a Live Event Vote Processor that tabulates the cached voting data from the vote cache to generate the intermediate voting results.

21. The interactive voting system as set forth in claim 20, wherein the Live Event Vote Processor tabulates the intermediate voting results to compute a final voting result in real time.

22. In a computer network having a plurality of clients and a server, a computer-implemented method for providing interactive voting over the Internet during a live television broadcast, comprising:
presenting a survey question and a number of responses to voters viewing the live television broadcast;
directing voters viewing the live television broadcast to cast a raw vote for one or more of the responses by using at least one of the plurality of clients to visit a web site of a sponsor of the live television broadcast;
transmitting votes submitted by the voters using the plurality of clients over the Internet to the server located at the sponsor's web site;
providing an object resident in memory on the server that contains procedures and instructions for manipulating the raw votes;
accumulating the raw votes in the server memory in a memory cache during a predefined time interval, the raw votes having never been written in a database;
tabulating as a batch in the memory cache the accumulated cached raw votes at the end of the predefine time interval to generate an intermediate voting result, wherein the votes are cached and tabulated prior to writing in the database;
writing the intermediate voting result and each raw vote accumulated over the predefined time interval to the database at the end of the predefined time interval only after each raw vote received has been cached and tabulated as a batch in the memory cache;
establishing and maintaining a persistent connection between the object and the database to facilitate writing of the intermediate voting results;
repeating the accumulation of votes and the writing of intermediate results to the database to obtain a plurality of intermediate results;
tabulating the plurality of intermediate results to obtain a final voting result in real time; and
presenting the final voting results within time constraints of the live television broadcast.

23. The computer-implemented method as set forth in claim 22, wherein the persistent connection comprises at least three persistent connections.

24. The computer-implemented method as set forth in claim 22, further comprising caching the cached voting data in a vote cache.

25. The method as set forth in claim 1, further comprising writing each of the received votes to the database to allow cross-tabulation of demographic data.

26. The method as set forth in claim 1, wherein the predefined time interval is approximately fifteen seconds.

27. The method as set forth in claim 1, further comprising:
   tabulating in memory a plurality of the intermediate voting results written to the database such that the final voting results are updated; and
   writing the updated final voting results to the database.

28. The method as set forth in claim 27, further comprising updating the final voting results approximately every ten seconds.

* * * * *